US008261079B2

(12) United States Patent
Newman et al.

(10) Patent No.: US 8,261,079 B2
(45) Date of Patent: *Sep. 4, 2012

(54) ESTABLISHING SHARED INFORMATION IN A NETWORK

(75) Inventors: Richard E. Newman, Gainsville, FL (US); Lawrence W. Yonge, III, Ocala, FL (US)

(73) Assignee: Qualcomm Atheros, Inc, San Jose, CA (US)

(*) Notice: Subject to any disclaimer, the term of this patent is extended or adjusted under 35 U.S.C. 154(b) by 201 days.

This patent is subject to a terminal disclaimer.

(21) Appl. No.: 12/645,971

(22) Filed: Dec. 23, 2009

(65) Prior Publication Data

US 2010/0100741 A1  Apr. 22, 2010

Related U.S. Application Data

(63) Continuation of application No. 11/484,542, filed on Jul. 10, 2006, now Pat. No. 7,664,955.

(60) Provisional application No. 60/780,132, filed on Mar. 7, 2006.

(51) Int. Cl.
*H04L 29/06* (2006.01)
(52) U.S. Cl. ........................................ 713/171; 375/145
(58) Field of Classification Search .................. 713/171; 709/204
See application file for complete search history.

(56) References Cited

U.S. PATENT DOCUMENTS

| 5,745,578 | A | 4/1998 | Hassan et al. |
| 6,885,674 | B2 | 4/2005 | Hunt et al. |
| 7,334,127 | B2 | 2/2008 | Struik |
| 2004/0081321 | A1 | 4/2004 | Struik |
| 2004/0151108 | A1 | 8/2004 | Blasco Claret et al. |

OTHER PUBLICATIONS

"AirStation OneTouch Secure System (AOSS)," White Paper, Oct. 2004, (download from http://www.buffalotech.com/documents/pdf/AOSS_WP_Final.pdf).
IEEE Transactions on Information Theory, vol. 39, pp. 733-742, 1993.
Moran, Joseph. "Push-Button Wireless Security," Small Business Computing.com, Web Management ezine, Dec. 2, 2005 (downloaded from http://www.smallbusinesscomptuing.com/webmaster/article.php/3567981).
PCT International Search Report and Written Opinion dated Jul. 15, 2008. International Application No. PCT/US07/63472.
Securing Home Wi-Fi Networks: A Simple Solution Can Save Your Identity, White paper Wireless-WP200-x, May 21, 2005, (downloaded from http://www,54g.org/pdf/Wireless-WP200RDS.pdf).
International Search Report and Written Opinion—PCT/US2007/063472, International Searching Authority, ISA/US, Jul. 15, 2008 (112301WO).

*Primary Examiner* — Gilberto Barron, Jr.
*Assistant Examiner* — David Le
(74) *Attorney, Agent, or Firm* — DeLizio Gilliam, PLLC (57) ABSTRACT

A method for establishing shared information is described. The method includes estimating characteristics of a communication channel between two nodes based on signals transmitted between the nodes. The method also includes transmitting a signal from the first node to the second node, the signal being modulated with a first data sequence according to a first estimated characteristic, and transmitting a signal from the second node to the first node, the signal being modulated with a second data sequence according to a second estimated characteristic. Shared information is formed at each of the first and second nodes based on at least a portion of the first data sequence and at least a portion of the second data sequence.

48 Claims, 2 Drawing Sheets

ESTABLISHING SHARED INFORMATION IN A NETWORK

CROSS-REFERENCE TO RELATED APPLICATIONS

This application is a continuation of U.S. application Ser. No. 11/484,542, filed on Jul. 10, 2006, now U.S. Pat. No. 7,664,955 which claims priority to U.S. Provisional Application Ser. No. 60/780,132, filed on Mar. 7, 2006, each of which is incorporated herein by reference.

TECHNICAL FIELD

The invention relates to network protocols, and more particularly to establishing shared information between nodes in a network.

BACKGROUND

Techniques for establishing secure communications in communication systems include various cryptography techniques including symmetric cryptography techniques based on "secret" information shared among communicating entities (e.g., nodes or "stations" in a network). The extent to which the shared information is secret determines the extent to which the communication is secure against potential eavesdropping. In symmetric cryptography techniques, security between a transmitting station and a receiving station in a communication network is based on prior existence of a shared secret (or "private") key used to perform encryption and decryption.

Other techniques include asymmetric (e.g., public-key) cryptography techniques that do not necessarily require secret shared information. In asymmetric cryptography techniques, stations can communicate securely without necessarily starting with a shared secret key. For example, in public-key cryptography, a "public key" and a "private key" pair are used. The public key can be sent over a communication channel between communicating stations, or otherwise distributed to the "public" including a potential eavesdropper without compromising security. The private key is kept secret and is only known to a receiver, and thus should not be able to be (easily) derived from the public key. The private key is mathematically related to the public key and can be used to decrypt a message that has been encrypted with the public key. However, the public key cannot be used to decrypt the encrypted message. Thus, any station can securely send data to the receiver by using the public key to encrypt the data.

Various security protocols can use public-key cryptography to establish other forms of cryptography. For example, public-key cryptography can be used to securely establish shared information (e.g., a private key or information from which a private key can be derived) for use in a symmetric cryptographic algorithm.

In some security protocols, a user does not necessarily need to explicitly provide an encryption key. In some cases, security protocols can be initiated by detecting actions of a user, such as the pressing of a button on respective devices. In some cases, devices are interfaced together to establish secret shared information, for example, by physically touching the devices or using near-field communications.

Secret shared information can be established using a protocol that relies on characteristics of a physical communication channel. For example, a "secrecy capacity" between a transmitter and receiver is based on a channel capacity to a potential eavesdropper compared to a channel capacity to the receiver. The secrecy capacity represents a limit on the rate at which secret information can be securely (without being deduced by an eavesdropper) communicated from the transmitter to the receiver. For a certain class of channels, the secrecy capacity is the difference between these channel capacities.

SUMMARY

The invention features a technique for establishing shared information between two nodes based on adapting signals to a communication channel between two nodes, and forming shared information at each of the nodes based on exchanged messages using the channel adaptation. We now summarize various aspects and features of the invention.

In one aspect, the invention features a method for establishing shared information, and a corresponding communication node. The method includes estimating characteristics of a communication channel between two nodes based on signals transmitted between the nodes; transmitting a signal from the first node to the second node, the signal being modulated with a first data sequence according to a first estimated characteristic; transmitting a signal from the second node to the first node, the signal being modulated with a second data sequence according to a second estimated characteristic; and forming shared information at each of the first and second nodes based on at least a portion of the first data sequence and at least a portion of the second data sequence.

Implementations of the invention may incorporate one or more of the following.

The first data sequence is randomly generated at the first node, and the second data sequence is randomly generated at the second node.

The data sequences are randomly generated to have a length between a minimum length and a maximum length.

Transmitting the signal from the first node to the second node comprises transmitting a signal from the first node to the second node in response to determining that a previously transmitted signal was not acknowledged by the second node, each transmitted signal being modulated with a different data sequence according to the first estimated characteristic.

Each transmitted signal is modulated with a different randomly generated data sequence.

The portion of the first data sequence and the portion of the second data sequence comprise portions of approximately equal length.

The portion of the first data sequence comprises a portion of length L at the beginning of the first data sequence, and the portion of the second data sequence comprises a portion of length L at the end of the second data sequence.

Forming the shared information at each of the first and second nodes comprises, at each node: performing a predetermined function on the portion of the first data sequence; performing the predetermined function on the portion of the second data sequence; and combining the results of the predetermined functions to form the shared information.

Combining the results comprises concatenating the results.

The predetermined function comprises a hash function.

Forming the shared information at each of the first and second nodes comprises, at each node: combining the portion of the first data sequence and the portion of the second data sequence to form a combined sequence; and performing a predetermined function on the combined sequence to form the shared information.

Combining the portion of the first data sequence and the portion of the second data sequence comprises concatenating the portions.

The predetermined function comprises a hash function.

The first estimated characteristic comprises a characteristic of the communication channel associated with transmission from the first node to the second node, and the second estimated characteristic comprises a characteristic of the communication channel associated with communication from the second node to the first node.

Estimating characteristics of a communication channel between the two nodes comprises estimating characteristics associated with a plurality of carriers having different carrier frequencies associated with the channel.

The signal from the first node to the second node and the signal from the second node to the first node each includes a plurality of carriers, at least some of which are modulated according to estimated characteristics associated with the respective carriers.

The carriers comprise orthogonal frequency division multiplexing (OFDM) carriers.

Estimating characteristics of the communication channel comprises estimating the first estimated characteristic at the second node based on a predetermined signal transmitted from the first node.

The first estimated characteristic comprises an estimate of a signal-to-noise ratio associated with the received predetermined signal.

The first estimated characteristic comprises an estimate of a bit error rate associated with the received predetermined signal.

The method further comprises transmitting modulation information based on the first estimated characteristic from the second node to the first node.

The signal modulated with the first data sequence is modulated based on the received modulation information.

The modulation is selected to achieve a data rate that is higher than 90% of a data rate limit associated with the first estimated characteristic.

The modulation information comprises a map that designates a type of modulation that is to be used, respectively, on each of multiple carriers in a signal.

The type of modulation indicates a constellation for phase and/or amplitude modulation.

The carriers comprise orthogonal frequency division multiplexing (OFDM) carriers.

The modulation information comprises a forward error correction code rate.

The modulation information comprises a guard interval length between modulated symbols.

The predetermined signal transmitted from the first node includes one or more symbols known to the second node from which the second node estimates the first estimated characteristic.

The first node repeatedly transmits the predetermined signal until receiving a response from second node.

The predetermined signal transmitted from the first node is modulated based on default modulation information.

The communication channel comprises a path between the nodes over a shared medium.

The shared medium comprises a wired communication medium.

The shared medium comprises an alternating current (AC) power line network.

The communication channel has at least one varying channel characteristic that varies approximately periodically.

The varying channel characteristic comprises noise that varies according to an alternating current (AC) power line waveform.

The varying channel characteristic comprises a frequency response that varies according to an alternating current (AC) power line waveform.

The method further comprises estimating the characteristics of the communication channel based on signals transmitted in associated phase regions of the periodically varying channel characteristic.

The signal modulated with the first data sequence is transmitted in a phase region of the periodically varying channel characteristic corresponding to the phase region associated with the first estimated characteristic.

The signal modulated with the second data sequence is transmitted in a phase region of the periodically varying channel characteristic corresponding to the phase region associated with the second estimated characteristic.

Among the many advantages of the invention (some of which may be achieved only in some of its various aspects and implementations) are the following.

Shared information can be established and used to form secure logical networks within a larger network. For example, in a power-line communication network, a consumer buying a device (e.g., a video device) is able to simply plug the device into a power outlet, and the device can join a logical network without the need for connecting additional physical wiring to the device. Many customers live in apartments and other buildings that share power lines, and so signals can cross property boundaries just as wireless signals can. There may be other boundaries at an even finer granularity. For example, students occupying a shared house might want to have one network each, and adolescents might want bedroom networks distinct from the general network in their parents' house. The communication protocol used by network interface modules 106 is able to support multiple virtual networks and is able to provide various forms of security for the networks.

In some situations, power-line networks can become unmanageably large. If all the devices in a large apartment block are allowed to assemble themselves into a single network, the performance can drop significantly. Thus, networks may be partitioned into logical networks for performance reasons, even if security is not an issue.

A technique for exchanging a key relies on aspects of signal processing to provide security without necessarily requiring public-key cryptography. For example, an "adapted exchange" technique relies on channel characteristics such as the path-specific frequency selective fading in power-line channels, such that a potential eavesdropper in a neighboring residence is likely to have poorer reception of a station in a residence than other stations in the same residence. In cases in which the channel adaptation mechanism is relatively aggressive in nearing the Shannon limit, an eavesdropper may not receive a signal with a high enough signal-to-noise ratio to be able to recover information from the signal without error.

The adapted exchange technique provides a simplified way for a user to set up a network in a secure way, without needing to generate or maintain keys or passwords manually. An adapted exchange protocol can be one of multiple protocols available to a user as different modes for establishing security. A security mode associated with a station can be set by the user, for example, based on the ease of use and the user's perceived need for security and/or privacy. In some cases, a user may wish to use a more secure protocol instead of, or in combination with, the adapted exchange protocol.

In an example of the adapted exchange technique, a pair of stations adapt signals to characteristics of the channel to send each other partial keys, which are concatenated and hashed to produce a temporary encryption key that both may then use. An eavesdropper would need to know the way in which the signals are adapted to the channel (e.g., tone maps used in both directions) and correctly demodulate the signals in order to obtain the partial keys. Even if a potential eavesdropper were able to measure which of the tone maps was in use on a particular link, demodulation by a station other than the intended recipient would be difficult due to the mismatch in channel characteristics. Even if an eavesdropper were able to correctly demodulate most of the bits of the partial keys and correct some errors, since a hash function is performed on the partial keys every uncertain bit in the partial keys doubles the eavesdropper's search space of possible encryption keys, since the hash value depends on every bit of input in an unpredictable fashion. Thus, the eavesdropper would need to correctly guess values for all of the remaining uncertain bits to obtain the encryption key.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

As used herein, a "randomly generated" number or sequence of digits or characters includes a number or sequence generated using techniques to generate random or pseudorandom numbers.

Other features and advantages of the invention will be found in the detailed description, drawings, and claims.

DETAILED DESCRIPTION

Figure 1:
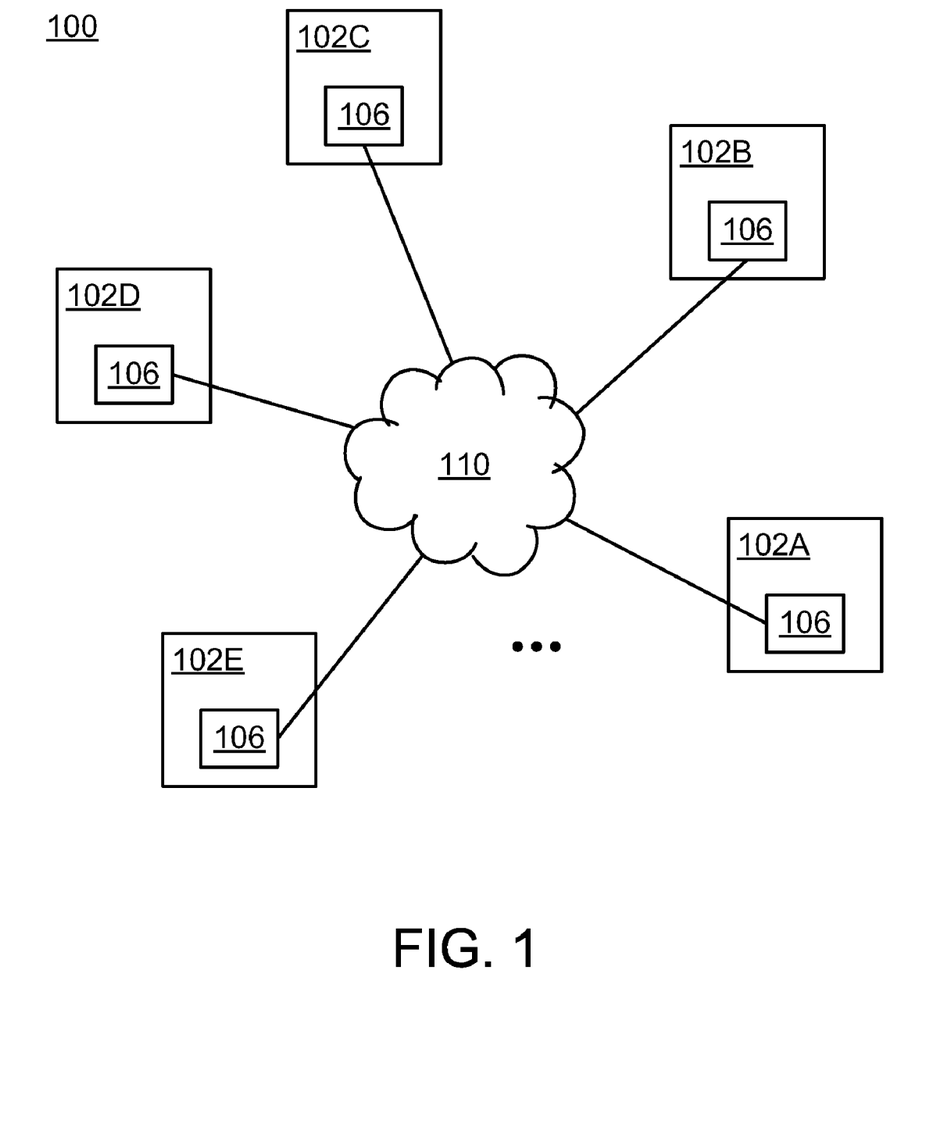
FIG. 1 is a schematic diagram of a network configuration.

There are a great many possible implementations of the invention, too many to describe herein. Some possible implementations that are presently preferred are described below. It cannot be emphasized too strongly, however, that these are descriptions of implementations of the invention, and not descriptions of the invention, which is not limited to the detailed implementations described in this section but is described in broader terms in the claims.
System Overview As shown in FIG. 1, a network configuration 100 provides a shared communication medium 110 for a number of communication stations 102A-102E (e.g., computing devices, or audiovisual devices) to communicate with each other. The communication medium 110 can include one or more types of physical communication media such as coaxial cable, unshielded twisted pair, or power lines, for example. The network configuration 100 can also includes devices such as bridges or repeaters. The communication stations 102A-102E communicate with each other using predetermined physical (PHY) layer and medium access control (MAC) layer communication protocols used by network interface modules 106. The MAC layer is a sub-layer of the data link layer and provides an interface to the PHY layer, according to the Open Systems Interconnection (OSI) network architecture standard. The network configuration 100 can have any of a variety of network topologies (e.g., bus, tree, star, mesh).

The stations use the adapted exchange technique for establishing shared information between a given pair of stations for use in secure communications. The adapted exchange technique is based on adapting signals to a communication channel between two nodes, and forming shared information at each of the nodes based on exchanged messages using the channel adaptation (e.g., transmission parameters such as type of modulation used on signal carriers, and corresponding bit loading). In some cases, the channel adaptation provides the highest data rate that can be achieved on the channel for a given tolerable bit error rate. By selecting the channel adaptation in this manner, it becomes less likely that the signals can be correctly received and demodulated by other stations (e.g., potential eavesdroppers). The adapted exchange technique also includes estimating characteristics of the communication channel based on signals transmitted between the nodes, and forming shared information at each of the nodes based on exchanged data sequences that have been modulated according to the estimated characteristics. The data sequences can be randomly generated, for example, using techniques that use a procedure or function to realize or approximate a desired statistical distribution, such as a pseudorandom number generation function.

In some implementations, the network interface modules 106 use protocols that include features to improve performance when the network configuration 100 includes a communication medium 110 that exhibits varying transmission characteristics. For example, the communication medium 110 may include AC power lines in a house, optionally coupled to other media (e.g., coaxial cable lines).

Power-line communication systems use existing AC wiring to exchange information. Owing to their being designed for much lower frequency transmissions, AC wiring provides varying channel characteristics at the higher frequencies used for data transmission (e.g., depending on the wiring used and the actual layout). To increase the data rate between various links, stations adjust their transmission parameters dynamically. This process is called channel adaptation. Channel adaptation results in adaptation information specifying a set of transmission parameters that can be used on each link. Adaptation information includes such parameters as the frequencies used, their modulation, and the forward error correction (FEC) used.

The communication channel between any two stations provided by the communication medium 110 may exhibit varying channel characteristics such as periodic variation in noise characteristics and frequency response. To improve performance and QoS stability in the presence of varying channel characteristics, the stations can synchronize channel adaptation with the frequency of the AC line (e.g., 50 or 60 Hz). There are typically variations in the phase and frequency of the AC line cycle from the power generating plant and local noise and load changes. This synchronization enables the stations to use consistent channel adaptation optimized for a particular phase region of the AC line cycle. An example of such synchronization is described in U.S. patent application Ser. No. 11/337,946, incorporated herein by reference.

Another aspect of mitigating potential impairments caused by the varying channel characteristics involves using a robust signal modulation format such as orthogonal frequency division multiplexing (OFDM), also known as Discrete Multi Tone (DMT). OFDM is a spread spectrum signal modulation technique in which the available bandwidth is subdivided into a number of narrowband, low data rate channels or "carriers." To obtain high spectral efficiency, the spectra of the carriers are overlapping and orthogonal to each other. Data are transmitted in the form of symbols that have a predetermined duration and encompass some number of carriers. The data transmitted on these carriers can be modulated in amplitude and/or phase, using modulation schemes such as Binary Phase Shift Key (BPSK), Quadrature Phase Shift Key (QPSK), or m-bit Quadrature Amplitude Modulation (m-QAM).

Some communication networks use a "central coordinator" (CCo) station that is selected to provide certain coordination functions for at least some of the other stations in the network configuration 100. A set of stations operating under the coordination of a single CCo is called a Basic Service Set (BSS). Functions performed by the CCo include: authentication of stations upon joining the BSS, provisioning of identifiers for stations, and scheduling and timing of medium access. For example, the CCo broadcasts a repeated beacon transmission from which the stations in the BSS can determine scheduling and timing information. This beacon transmission includes fields that carry information used by the stations to coordinate communication. Though the format of each of the repeated beacon transmission is similar, the content typically changes in each transmission. The beacon transmission is repeated approximately periodically, and, in some implementations, is synchronized to a characteristic of the communication medium 110. In some cases, a Proxy Coordinator (PCo) can be used to manage stations that are "hidden" from the CCo (e.g., stations that do not reliably receive signals from the CCo).

There may be differences in the access techniques implemented by different MAC protocols. For example, a MAC protocol can use a carrier sense multiple access with collision avoidance (CSMA/CA) technique to access the network configuration 100. Another MAC protocol uses a time division multiple access (TDMA) technique. Some MAC protocols include a contention-free period (CFP) in which a TDMA technique is used, and also include a contention period (CP) in which a CSMA/CA technique is used. The contention-free period is scheduled and managed by the CCo to provide improved quality of service (QoS) for certain applications run on a device (e.g., audio and/or video applications). Other MAC protocols can use any one or combination of these or other access techniques.

PHY Layer Communication System Architecture

Any of a variety of communication system architectures can be used to implement the portion of the network interface module 106 that converts data to and from a signal waveform that is transmitted over the communication medium. An application running on a station provides and receives data to and from the network interface module 106 in segments. A "MAC Protocol Data Unit" (MPDU) is a segment of information including overhead and payload fields that the MAC layer has asked the PHY layer to transport. An MPDU can have any of a variety of formats based on the type of data being transmitted. A "PHY Protocol Data Unit (PPDU)" refers to the modulated signal waveform representing an MPDU that is transmitted over the power line.

In OFDM modulation, data are transmitted in the form of OFDM "symbols." Each symbol has a predetermined time duration or symbol time $T_s$. Each symbol is generated from a superposition of N sinusoidal carrier waveforms that are orthogonal to each other and form the OFDM carriers. Each carrier has a peak frequency $f_i$ and a phase $\Phi_i$ measured from the beginning of the symbol. For each of these mutually orthogonal carriers, a whole number of periods of the sinusoidal waveform is contained within the symbol time $T_s$. Equivalently, each carrier frequency is an integral multiple of a frequency interval $\Delta f = 1/T_s$. The phases $\Phi_i$ and amplitudes $A_i$ of the carrier waveforms can be independently selected (according to an appropriate modulation scheme) without affecting the orthogonality of the resulting modulated waveforms. The carriers occupy a frequency range between frequencies $f_1$ and $f_N$ referred to as the OFDM bandwidth.

Figure 2:
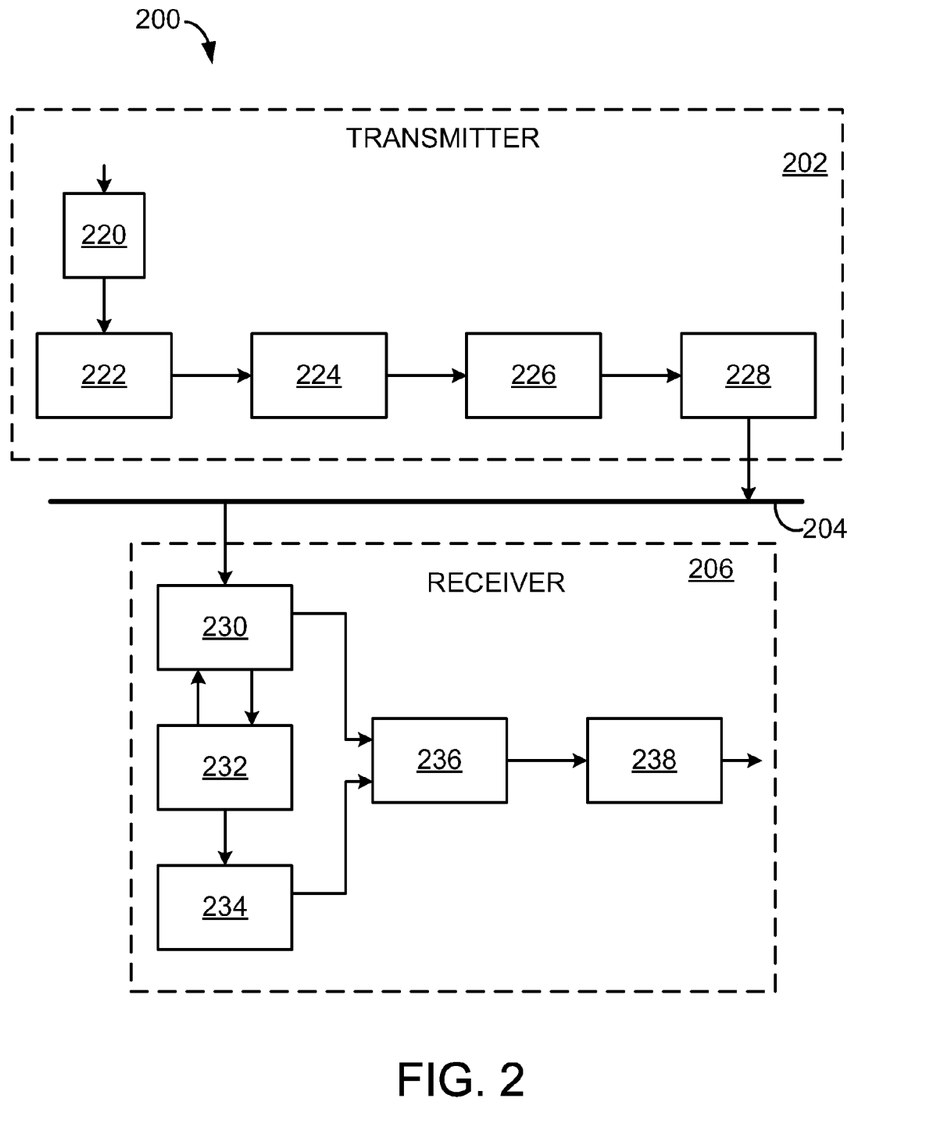
FIG. 2 is a block diagram of a communication system.

Referring to FIG. 2, a communication system 200 includes a transmitter 202 for transmitting a signal (e.g., a sequence of OFDM symbols) over a communication medium 204 to a receiver 206. The transmitter 202 and receiver 206 can both be incorporated into a network interface module 106 at each station. The communication medium 204 can represent a path from one device to another over the power line network.

At the transmitter 202, modules implementing the PHY layer receive an MPDU from the MAC layer. The MPDU is sent to an encoder module 220 to perform processing such as scrambling, error correction coding and interleaving.

The encoded data is fed into a mapping module 222 that takes groups of data bits (e.g., 1, 2, 3, 4, 6, 8, or 10 bits), depending on the constellation used for the current symbol (e.g., a BPSK, QPSK, 8-QAM, 16-QAM constellation), and maps the data value represented by those bits onto the corresponding amplitudes of in-phase (I) and quadrature-phase (Q) components of a carrier waveform of the current symbol. This results in each data value being associated with a corresponding complex number $C_i = A_i \exp(j\Phi_i)$ whose real part corresponds to the I component and whose imaginary part corresponds to the Q component of a carrier with peak frequency $f_i$. Alternatively, any appropriate modulation scheme that associates data values to modulated carrier waveforms can be used.

The mapping module 222 also determines which of the carrier frequencies $f_1, \ldots, f_N$ within the OFDM bandwidth are used by the system 200 to transmit information. For example, some carriers that are experiencing fades can be avoided, and no information is transmitted on those carriers. Instead, the mapping module 222 uses coherent BPSK modulated with a binary value from the Pseudo Noise (PN) sequence for that carrier. For some carriers (e.g., a carrier i=10) that correspond to restricted bands (e.g., an amateur radio band) on a medium 204 that may radiate power no energy is transmitted on those carriers (e.g., $A_{10}=0$). The mapping module 222 also determines the type of modulation to be used on each of the carriers (or "tones") according to a "tone map." The tone map can be a default tone map, or a customized tone map determined by the receiving station that has been adapted to characteristics of the communication medium 204 (e.g., for use with adapted exchange techniques).

An inverse discrete Fourier transform (IDFT) module 224 performs the modulation of the resulting set of N complex numbers (some of which may be zero for unused carriers) determined by the mapping module 222 onto N orthogonal carrier waveforms having peak frequencies $f_1, \ldots, f_N$. The modulated carriers are combined by IDFT module 224 to form a discrete time symbol waveform S(n) (for a sampling rate $f_R$), which can be written as $$S(n) = \sum_{i=1}^{N} A_i \exp[j(2\pi i n / N + \Phi_i)] \qquad \text{Eq. (1)}$$

where the time index n goes from 1 to N, Ai is the amplitude and $\Phi_i$ is the phase of the carrier with peak frequency $f_i = (i/N)f_R$, and $j=\sqrt{-1}$. In some implementations, the discrete Fourier transform corresponds to a fast Fourier transform (FFT) in which N is a power of 2.

A post-processing module 226 combines a sequence of consecutive (potentially overlapping) symbols into a "symbol set" that can be transmitted as a continuous block over the communication medium 204. The post-processing module 226 prepends a preamble to the symbol set that can be used for automatic gain control (AGC) and symbol timing synchronization. To mitigate intersymbol and intercarrier interference (e.g., due to imperfections in the system 200 and/or the communication medium 204) the post-processing module 226 can extend each symbol with a cyclic prefix that is a copy of the last part of the symbol. The post-processing module 226 can also perform other functions such as applying a pulse shaping window to subsets of symbols within the symbol set (e.g., using a raised cosine window or other type of pulse shaping window) and overlapping the symbol subsets.

An Analog Front End (AFE) module 228 couples an analog signal containing a continuous-time (e.g., low-pass filtered) version of the symbol set to the communication medium 204. The effect of the transmission of the continuous-time version of the waveform S(t) over the communication medium 204 can be represented by convolution with a function $g(\tau; t)$ representing an impulse response of transmission over the communication medium. The communication medium 204 may add noise n(t), which may be random noise and/or narrowband noise emitted by a jammer.

At the receiver 206, modules implementing the PHY layer receive a signal from the communication medium 204 and generate an MPDU for the MAC layer. An AFE module 230 operates in conjunction with an Automatic Gain Control (AGC) module 232 and a time synchronization module 234 to provide sampled signal data and timing information to a discrete Fourier transform (DFT) module 236.

After removing the cyclic prefix, the receiver 206 feeds the sampled discrete-time symbols into DFT module 236 to extract the sequence of N complex numbers representing the encoded data values (by performing an N-point DFT). Demodulator/Decoder module 238 maps the complex numbers onto the corresponding bit sequences and performs the appropriate decoding of the bits (including deinterleaving and descrambling).

Any of the modules of the communication system 200 including modules in the transmitter 202 or receiver 206 can be implemented in hardware, software, or a combination of hardware and software.

Channel Estimation and Adaptation

Channel estimation is the process of measuring the characteristics of the communication medium to adapt the operation of the PHY layer to provide improved performance.

Adapting to the estimated characteristics can include:
Selection of the tone map designating modulation method (s) to be used on each carrier. Any given carrier may use different modulations at different times within the beacon period.
Selection of the FEC rate.
Selection of the guard interval length.
Selection of the intervals within the beacon period where a particular tone map, FEC rate, and guard interval setting applies.

For a power-line communication medium, the FEC rate and guard interval length can vary over the AC line cycle period, but they are the same for all carriers at any given time.

In cases in which a CCo is used, the results of channel estimation can be reported to the CCo for use in allocating time slots in the CFP. The CCo can allocate time for communication between a transmitting and receiving station to perform channel estimation. The CCo can then use this channel estimation information in determining or updating the schedule of time slots allocated to stations in the CFP.

The channel-estimation procedures may differ slightly between the CP and the CFP. In the CP, the receiving station can designate a default Tone Map that may be used by the transmitting station anywhere in the CP. The receiving station may optionally define additional Tone Maps that may be used in the CP during particular intervals of the beacon period. This approach allows the transmitting station to begin communicating using Tone Map modulated data quickly, and avoids complicated interactions between the CSMA access procedure and the channel-estimation procedures for the CP. This approach is well suited to the transport of best effort data. Alternatively, the receiving station can designate intervals within a beacon period over which particular channel adaptation applies without taking into account whether a transmission is within the CP or the CFP.

Before data communication occurs in the CFP, the receiving station defines a tone map that is valid in the interval of the beacon period where the transmission is scheduled. If no valid tone map is defined in an interval, the transmitting station sends a "SOUND MPDU" in the interval until the receiving station defines a tone map that for the interval. The SOUND MPDU includes a signal known to the receiving station from which the receiving station can estimate characteristics of the channel. The receiving station defines a tone map in which the modulation for a carrier is tailored to the characteristics of the channel at that carrier frequency. In addition to channel characteristics, the receiving station can also define a tone map based on a type of data to be transmitted (e.g., more robust modulation for applications more sensitive to data loss). The tone map is sent to the transmitting station in a channel estimation response (CER) message.

Alternatively, if no valid tone map is defined in an interval, the transmitting station can use a default tone map that has enough redundancy to be successfully transmitted assuming worst case channel characteristics. This default tone map may be more appropriate if the transmitting station only has a relatively small amount of data to send. The default tone map can also be used to broadcast information to multiple stations. However, the default tone map is not used for adapted exchange to establish shared information since the adapted exchange technique relies on security benefits provided by signals whose modulation has been adapted to estimated channel characteristics.

The channel-estimation procedures also include mechanisms for maintaining the lists of the intervals within the beacon period where each tone map may be used. Tone map intervals are defined as time periods within the beacon period where a particular tone map may be used. Since the CCo locks the beacon period to the AC line cycle, intervals are synchronized to the AC line cycle.

The receiving station specifies the intervals within which various tone maps may be used, subject to certain guidelines, which may include any of the following:
The CP default tone map may be used anywhere in the contention period.
With the exception of default tone map, intervals are disjoint (non-overlapping).
The transmitter may not transmit PPDUs with the PPDU Payload crossing the boundary between intervals using different tone maps.
The receiver specifies intervals that are large enough to carry a complete PPDU, based on the indicated tone map.
The current intervals definition is carried in the CER message.

The current intervals definition becomes stale if a period of 30 seconds has elapsed since the last CER message was received from the receiving station.

Adapted Exchange

A station can use the adapted exchange technique for establishing shared information with another station based on the results of channel estimation in both directions. The tone maps adaptively selected for each direction according to the estimated channel characteristics provide a certain degree of security. In some cases, different tone maps are also selected for different virtual links between the pair of stations.

The established shared information can be used as, or used to compute, a Temporary Encryption Key (TEK) that is used to encrypt messages on a temporary private channel between the two stations. The TEK can be an AES encryption key, for example. To increase the level of security, stations can be configured to discard the TEK, after a predetermined amount of time, or after some other predetermined event.

In an exemplary adapted exchange key distribution protocol, two stations participating in the protocol (station A and station B) receive some positive indication from a user (e.g., a press of a button on each of the respective stations within a given time interval) that the stations are to join the same logical network (e.g., a BSS). In some cases, one station is already associated with a logical network (e.g., a CCo station), and the other station is joining as a new member of the network. If neither station is associated with a logical network, the stations may form a new logical network. The first station to send a message in the protocol is called the "initiator" and the other station is called the "respondent."

The two stations then perform channel estimation and adaptation to establish an adapted tone map for modulating signals from station A to station B, and an adapted tone map for modulating signals from station B to station A. Before the adapted tone maps have been determined, the stations use a default tone map to exchange initial (unsecure) messages in the protocol. The default tone map is designed to work even in the presence of channel impairments such as fading or low signal-to-noise ratio.

After the adapted tone maps have been determined, each station transmits a secret "partial key" to the other station using a signal modulated according to the adapted tone map. The partial keys are strings generated by a pseudorandom number generator. In some protocols, the pseudorandom number generator is configured to generate partial keys that have a variable length between a minimum length (e.g., 64 octets) and a maximum length (e.g., 384 octets). In other protocols, the pseudorandom number generator is configured to generate partial keys that have a fixed length (e.g., 384 octets). The exchanged partial keys are not encrypted, but there are many possible adapted tone maps that could potentially be used, and a potential eavesdropper would not be able to properly demodulate the signal without knowing which tone map to use.

The partial keys can be transmitted with an acknowledgement protocol that includes transmitting a signal from a first station to a second station with a new partial key in response to determining that a previously transmitted signal carrying a partial key was not acknowledged by the second station. If the first station does not receive an acknowledgment from the second station that the partial key was properly received (e.g., received without error), then the first station transmits a different randomly generated partial key modulated according to the adapted tone map. By not retransmitting a given randomly generated partial key (or by limiting the number of times a given partial key can be retransmitted) a potential eavesdropper would not be able to take advantage of many transmissions of the same key to correct errors due to an incompatible tone map.

For example, a tone map can specify modulation rates (number of bits per symbol) for each of multiple (e.g., hundreds) of carriers, along with other parameters such as the forward error correction coding rate, and the guard interval duration. Even if a potential eavesdropper were able to measure which of the tone maps was in use on a particular link, the transmission rate for each carrier is adapted to be close to the maximum rate possible given the signal-to-noise ratio (e.g., within 75%, 90%, or 95% of a data rate limit such as the Shannon channel capacity associated with an estimated signal-to-noise-ratio). Thus, interception of the data payload (the partial key) is a significant challenge since an eavesdropper may not be able to support the data rate determined by the tone map (e.g., the eavesdropper may have a high bit error rate due to a lower signal-to-noise ratio on at least some of the carriers).

At each station the two partial keys (the partial key generated at the station and the partial key received from the other station) are combined in a predetermined way to yield a combined key. A predetermined function, such as a hash function, is performed on the combined key to produce a shared TEK. For example, the first octet of the partial key provided by the initiator is the first octet of the combined key, and the last octet of the partial key provided by the respondent is the last octet of the combined key. Alternatively, a hash function can be performed on each partial key before they are combined in a predetermined way to form the TEK. If one or both stations do not properly receive the partial key from the other station, a new partial key is generated and transmitted.

After both stations have derived the TEK from the partial keys, the stations can proceed to participate in further protocols to establish secure communications and are able to send encrypted information (e.g., private keys for other security protocols) using the TEK to encrypt and decrypt the information (e.g., in a symmetric cryptography protocol). For example, a station that is already a member of a logical network can send a joining station a Network Membership Key (NMK) encrypted with the TEK. The new station can then use the NMK to decrypt a Network Encryption Key (NEK) sent from the CCo station. The NEK is used to encrypt and decrypt data payloads (e.g., using 128-bit AES CBC encryption). The CCo station may periodically distribute a new NEK to each station, which is encrypted using the NMK.

The adapted exchange protocol is simple from the perspective of the user. The user confirms entry of a new station into a network, for example, by pressing a button or responding affirmatively to a prompt, but the user is not necessarily required to perform more complex tasks such as generating a password. For example, the technique does not require a user to enter a password, or to receive an automatically generated password.

Many other implementations of the invention other than those described above are within the invention, which is defined by the following claims.

What is claimed is:

1. A method for establishing shared information, the method comprising:
   determining a first estimated characteristic of a communication channel between the first node and a second node based on one or more signals transmitted from the first node to the second node;
   determining a second estimated characteristic of the communication channel based on one or more signals transmitted from the second node to the first node;

generating a first data sequence at the first node;
generating a second data sequence at the second node;
transmitting a signal from the first node to the second node, at least a portion of the signal being modulated with the first data sequence according to the first estimated characteristic;
transmitting a signal from the second node to the first node, at least a portion of the signal being modulated with the second data sequence according to the second estimated characteristic; and
forming shared information at each of the first and second nodes based on at least a portion of the first data sequence and at least a portion of the second data sequence.

2. The method of claim 1, wherein the first data sequence is randomly generated at the first node, and the second data sequence is randomly generated at the second node.

3. The method of claim 2, wherein the data sequences are randomly generated to have a length between a minimum length and a maximum length.

4. The method of claim 1, wherein transmitting the signal from the first node to the second node comprises transmitting a signal from the first node to the second node in response to determining that a previously transmitted signal was not acknowledged by the second node, each transmitted signal being modulated with a different data sequence according to the first estimated characteristic.

5. The method of claim 4, wherein each transmitted signal is modulated with a different randomly generated data sequence.

6. The method of claim 1, wherein the portion of the first data sequence and the portion of the second data sequence comprise portions of approximately equal length.

7. The method of claim 6, wherein the portion of the first data sequence comprises a portion at the beginning of the first data sequence, and the portion of the second data sequence comprises a portion at the end of the second data sequence.

8. The method of claim 1, wherein forming the shared information at each of the first and second nodes comprises, at each node:
performing a predetermined function on the portion of the first data sequence;
performing the predetermined function on the portion of the second data sequence; and
combining the results of the predetermined functions to form the shared information.

9. The method of claim 8, wherein combining the results comprises concatenating the results.

10. The method of claim 8, wherein the predetermined function comprises a hash function.

11. The method of claim 1, wherein forming the shared information at each of the first and second nodes comprises, at each node:
combining the portion of the first data sequence and the portion of the second data sequence to form a combined sequence; and
performing a predetermined function on the combined sequence to form the shared information.

12. The method of claim 11, wherein combining the portion of the first data sequence and the portion of the second data sequence comprises concatenating the portions.

13. The method of claim 11, wherein the predetermined function comprises a hash function.

14. The method of claim 1, wherein the first estimated characteristic comprises a characteristic of the communication channel associated with transmission from the first node to the second node, and the second estimated characteristic comprises a characteristic of the communication channel associated with communication from the second node to the first node.

15. The method of claim 1, wherein estimating characteristics of a communication channel between the two nodes comprises estimating characteristics associated with a plurality of carriers having different carrier frequencies associated with the channel.

16. The method of claim 15, wherein the signal from the first node to the second node and the signal from the second node to the first node each includes a plurality of carriers, at least some of which are modulated according to estimated characteristics associated with the respective carriers.

17. The method of claim 15, wherein the carriers comprise orthogonal frequency division multiplexing (OFDM) carriers.

18. The method of claim 1, wherein determining the first estimated characteristic comprises estimating the first estimated characteristic at the second node based on a predetermined signal transmitted from the first node.

19. The method of claim 18, wherein the first estimated characteristic comprises an estimate of a signal-to-noise ratio associated with the received predetermined signal.

20. The method of claim 18, wherein the first estimated characteristic comprises an estimate of a bit error rate associated with the received predetermined signal.

21. The method of claim 18, further comprising transmitting modulation information based on the first estimated characteristic from the second node to the first node.

22. The method of claim 21, wherein the signal modulated with the first data sequence is modulated based on the received modulation information.

23. The method of claim 22, wherein the modulation is selected to achieve a data rate that is higher than 90% of a data rate limit associated with the first estimated characteristic.

24. The method of claim 22, wherein the modulation information comprises a map that designates a type of modulation that is to be used, respectively, on each of multiple carriers in a signal.

25. The method of claim 24, wherein the type of modulation indicates a constellation for phase and/or amplitude modulation.

26. The method of claim 24, wherein the carriers comprise orthogonal frequency division multiplexing (OFDM) carriers.

27. The method of claim 21, wherein the modulation information comprises a forward error correction code rate.

28. The method of claim 21, wherein the modulation information comprises a guard interval length between modulated symbols.

29. The method of claim 18, wherein the predetermined signal transmitted from the first node includes one or more symbols known to the second node from which the second node estimates the first estimated characteristic.

30. The method of claim 29, wherein the first node repeatedly transmits the predetermined signal until receiving a response from second node.

31. The method of claim 18, wherein the predetermined signal transmitted from the first node is modulated based on default modulation information.

32. The method of claim 1, wherein the communication channel comprises a path between the nodes over a shared medium.

33. The method of claim 32, wherein the shared medium comprises a wired communication medium.

34. The method of claim 33, wherein the shared medium comprises an alternating current (AC) power line network.

35. The method of claim 1, wherein the communication channel has at least one varying channel characteristic that varies approximately periodically.

36. The method of claim 35, wherein the varying channel characteristic comprises noise that varies according to an alternating current (AC) power line waveform.

37. The method of claim 35, wherein the varying channel characteristic comprises a frequency response that varies according to an alternating current (AC) power line waveform.

38. The method of claim 35, further comprising estimating the characteristics of the communication channel based on signals transmitted in associated phase regions of the periodically varying channel characteristic.

39. The method of claim 38, wherein the signal modulated with the first data sequence is transmitted in a phase region of the periodically varying channel characteristic corresponding to the phase region associated with the first estimated characteristic.

40. The method of claim 39, wherein the signal modulated with the second data sequence is transmitted in a phase region of the periodically varying channel characteristic corresponding to the phase region associated with the second estimated characteristic.

41. The method of claim 1, wherein the first data sequence is generated without the use of an encryption key.

42. The method of claim 41, wherein the second data sequence is generated without the use of an encryption key.

43. The method of claim 41, wherein the shared information comprises an encryption key.

44. The method of claim 1, wherein the first data sequence is not encrypted before the signal from the first node to the second node is modulated with the first data sequence.

45. The method of claim 44, wherein the second data sequence is not encrypted before the signal from the second node to the first node is modulated with the second data sequence.

46. The method of claim 44, wherein the shared information comprises an encryption key.

47. The method of claim 1, further comprising:
transmitting a signal from the first node to the second node, at least a portion of the signal being modulated with a third data sequence derived at least in part from at least a portion of the first data sequence and at least a portion of the second data sequence;
wherein forming the shared information at the second node based on at least a portion of the first data sequence and at least a portion of the second data sequence comprises forming the shared information at the second node based on at least a portion of the third data sequence.

48. A communication node, comprising:
circuitry configured to couple a signal to a communication medium; and
a network interface module coupled to the circuitry, and including circuitry configured to
determine a first estimated characteristic of a communication channel between the node and a second node based on one or more signals transmitted from the node to the second node;
generate a first data sequence;
transmit a signal to the second node, at least a portion of the signal being modulated with the first data sequence according to a first estimated characteristic;
receive a signal from the second node, at least a portion of the signal being modulated with a second data sequence generated at the second node according to a second estimated characteristic of the communication channel determined based on one or more signals transmitted from the second node to the node; and
form shared information based on at least a portion of the first data sequence and at least a portion of the second data sequence.

* * * * *